United States Patent [19]

Mori et al.

[11] Patent Number: 4,672,373

[45] Date of Patent: Jun. 9, 1987

[54] COMMUNICATION NETWORK SYSTEM

[75] Inventors: Kinji Mori, Yokohama; Shoji Miyamoto, Kawasaki; Hirokazu Ihara, Machida, all of Japan

[73] Assignee: Hitachi, Ltd., Tokyo, Japan

[21] Appl. No.: 683,500

[22] Filed: Dec. 19, 1984

[30] Foreign Application Priority Data

Dec. 23, 1983 [JP] Japan ............................... 58-242017

[51] Int. Cl.[4] ............................................ H04Q 11/04

[52] U.S. Cl. ................................ 340/825.05; 370/86; 370/16; 340/825.01

[58] Field of Search ...................... 340/825.16, 825.01, 340/825.05; 370/86, 87, 88, 14, 16; 179/18 EA, 18 H, 18 HA; 371/22, 25, 34

[56] References Cited

U.S. PATENT DOCUMENTS

Re. 28,811 5/1976 Pierce .................................... 370/88
3,710,026 1/1973 Graham et al. ....................... 370/88
3,748,647 7/1973 Ashany et al. ........................ 370/86
4,046,964 9/1977 Daugherty et al. .................. 370/14
4,064,369 12/1977 Battocletti ............................ 370/14
4,287,592 9/1981 Paulish et al. ........................ 370/88
4,532,625 7/1985 Stover .................................. 370/16

FOREIGN PATENT DOCUMENTS 0006816 9/1980 European Pat. Off. .

*Primary Examiner*—Donald J. Yusko
*Attorney, Agent, or Firm*—Antonelli, Terry & Wands

[57] ABSTRACT

Transmission line groups consisting of a plurality of loop-like transmission routes are mutually connected via transmission controllers, and are arranged on a two-dimensional or three-dimensional space. Therefore, processing units are connected as a homogeneous network in the matrix or mesh form by means of the loop-like transmission routes. The transmission controllers corresponding to the nodes of the network have a communication management function such that they send the data without grasping the situation on the transmission routes, independently check the trouble between the adjacent transmission controllers and specify the position of trouble. A communication network system such as a high local area network (LAN) or the like can be realized.

11 Claims, 11 Drawing Figures

COMMUNICATION NETWORK SYSTEM

BACKGROUND OF THE INVENTION

1. Field of the Invention

This invention relates to a structure of a network connecting a plurality of processing units to one another and to a management method of the network.

2. Description of the Prior Art

A bus structure, a loop structure and a star structure have been employed in the past which make homogeneous a network structure which connects a plurality of processing units to one another. A three-dimensional srructure can not be obtained by the former two structures, while the star structure involves the problem that communication management at the center of the network becomes complicated. Though a network structure which is not homogeneous has been known conventionally, such a network has naturally low expansibility, and communication management and maintenance of the network have been difficult.

SUMMARY OF THE INVENTION

In order to eliminate the problems of the prior art technique described above, the present invention is directed to provide a network structure and a communication management system which connect a plurality of processing units, that are disposed either planewise or three-dimensionally, by a plurality of looplike transmission routes with a homogeneous structure, and which let each of transmission controllers for connecting the processing units execute transmission and processing of abnormality homogeneously and equally, and only by local information.

To accomplish the object described above, the present invention is characterized by including transmission controllers connected to the points of intersection of a first group of loop-like transmission routes and a plurality of loop-like transmission routes crossing the first group and also crossing one another at at least one position within the same loop, and controlling the signal transmission between the crossing routes.

DESCRIPTION OF THE PREFERRED EMBODIMENTS

Hereinafter, the present invention will be described with reference to some preferred embodiments thereof.

Figure 1:
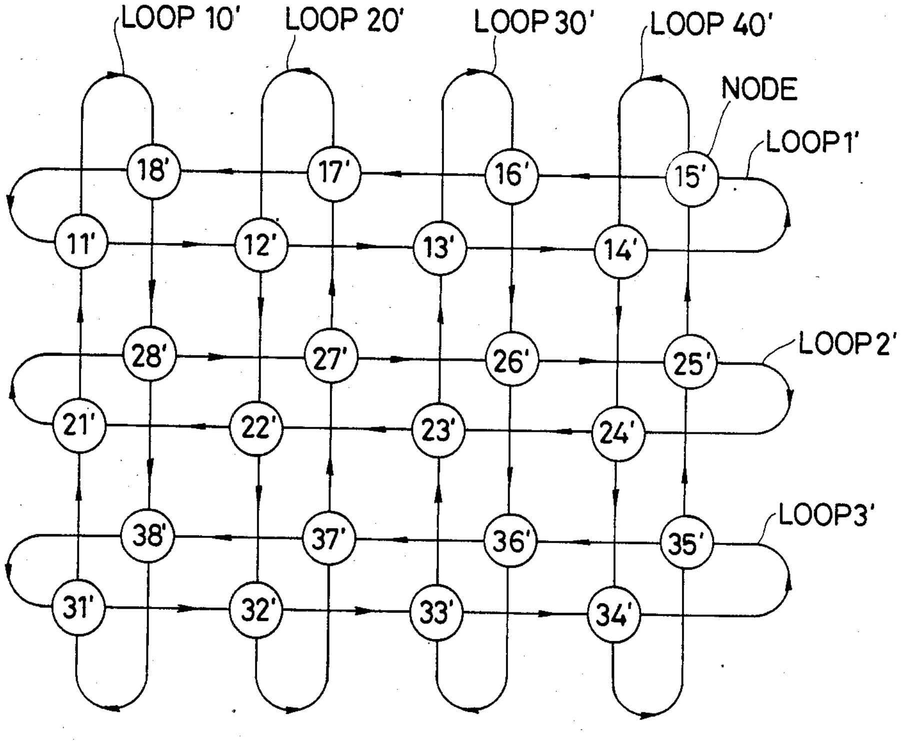
FIGS. 1 and 2 are structural views, each showing the network system in accordance with the present invention.
Figure 2:
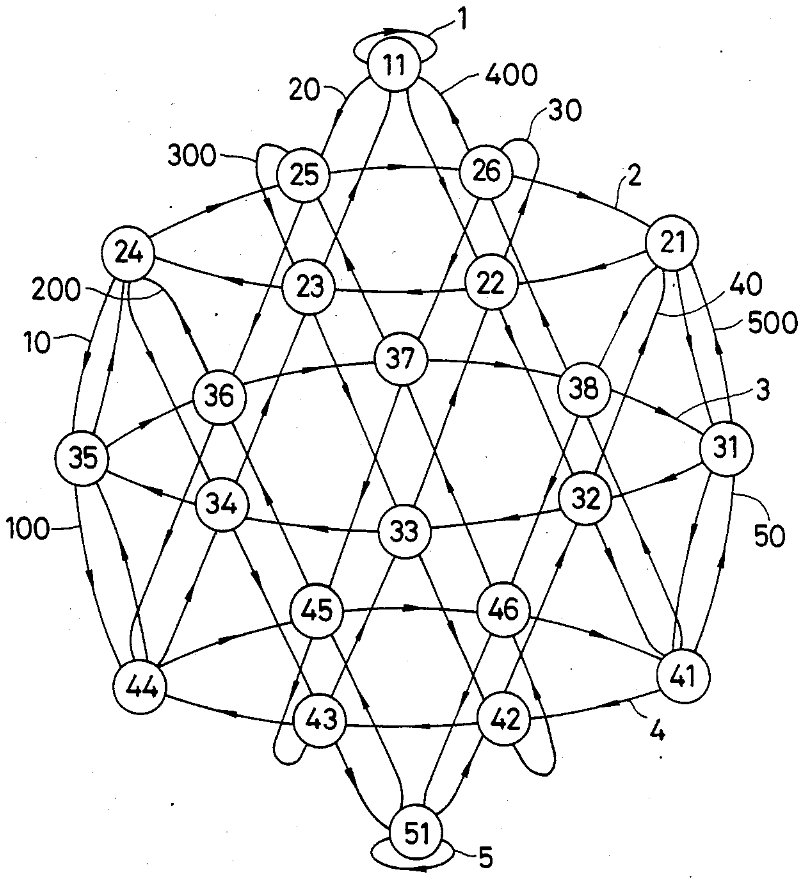

In FIG. 1, loop transmission routes are shown arranged in a matrix form in both longitudinal and transverse directions in such a manner as to surround a rectangular parallelepiped. In FIG. 2, the loop transmission routes are shown arranged in a mesh form in the transverse direction and in an oblique direction of 60° in such a manner as to surround a sphere. The loop transmission route consists of a transmission controller 111 having a uni-directional transmitting direction, and having also at each node a sending/receiving function with respect to the loop transmission route as shown in FIG. 3, and a terminal 112 connected to the transmission controller.

Figure 4:
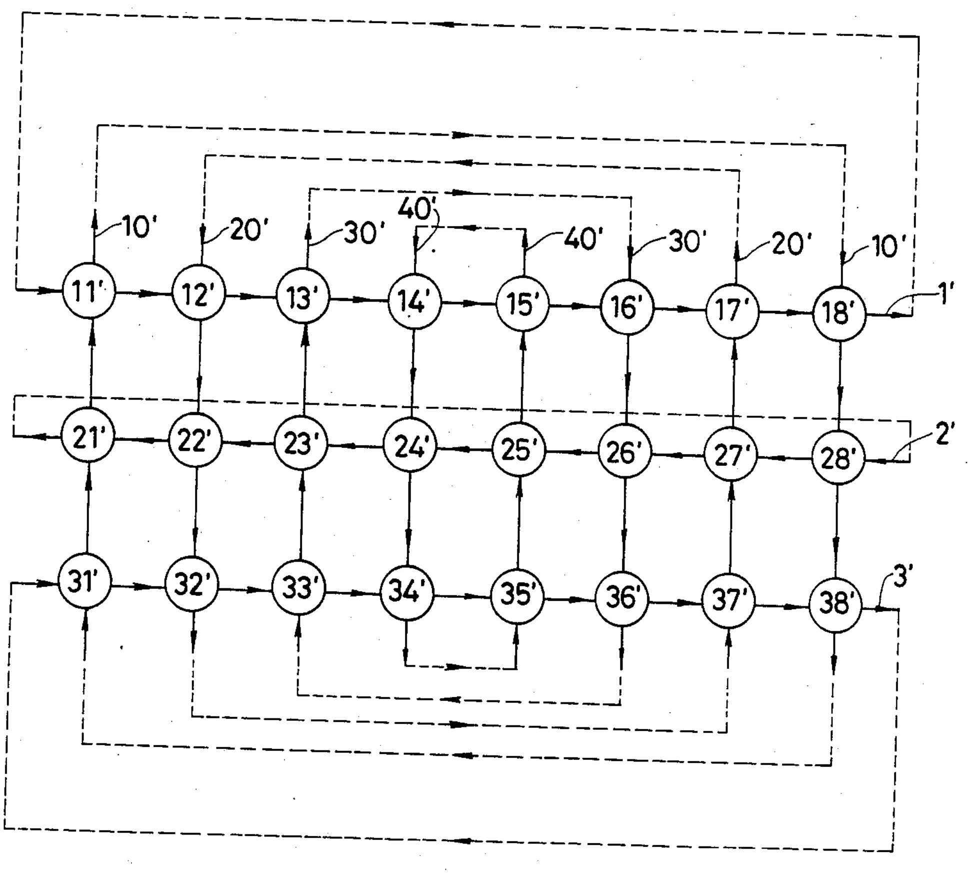
FIGS. 4 and 5 are structural views, each showing an example of network loop structures in the present invention.

In FIG. 1, the loop transmission routes are connected in such a manner as to surround the rectangular parallelepiped. That is, loops 1′, 2′ and 3′ are arranged in the transverse direction, and the nodes 11′–18′, 21′–28′ and 31′–38′ of each loop are connected to loop transmission routes 10′, 20′, 30′ and 40′ in the longitudinal direction. The nodes (11′, 18′, 28′, 38′, 31′, 21′), (12′, 22′, 32′, 37′, 27′, 17′), (13′, 16′, 26′, 36′, 33′, 23′) and (14′, 24′, 34′, 35′, 25′, 15) are sequentially connected to the loop transmission routes 10′, 20′, 30′ and 40′ in order named. This means that two loop transmission routes are connected to each node. FIG. 4 is an expanded view of the connection of the node connected three-dimensionally to one another, on a two-dimensional space.

Figure 5:
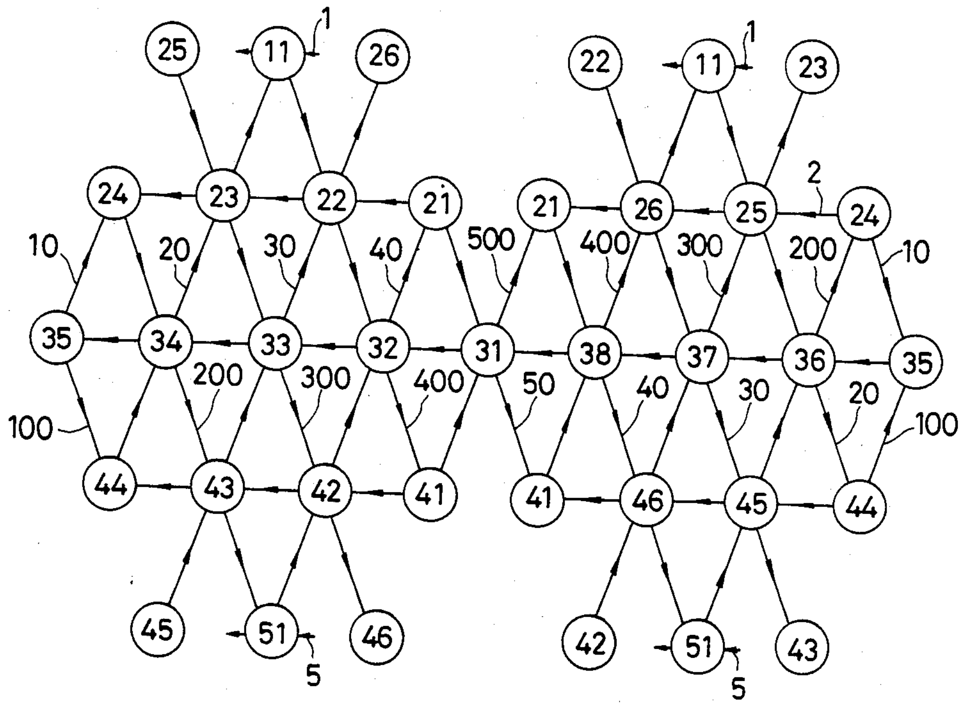

In FIG. 2, the loop transmission routes are connected in such a manner as to surround a sphere. The loops 1, 2, 3, 4 and 5 are arranged in the transverse direction, and the nodes 11, 21–26, 31–38, 41–56 and 51 are connected to the loop transmission routes 10, 20, 30, 40, 50, and 100, 200, 300, 400 and 500 in the oblique direction. The nodes (24, 25), (11, 25, 36, 44, 34, 23), (26, 37, 45, 43, 33, 22), (21, 38, 46, 51, 42, 32), (31, 41), (35, 44), (24, 34, 43, 51, 45, 36), (23, 33, 42, 46, 37, 25), (22, 32, 41, 38, 26, 11) and (21, 31) are sequentially connected to the loop transmission routes 10, 20, 30, 40, 50, 100, 200, 300, 400 and 500, in order named. This means that three loop transmission routes are connected to each node. FIG. 5 is an expanded view of the connection of the nodes connected three-dimensionally to one another, on a two-dimensional space.

Figure 3:
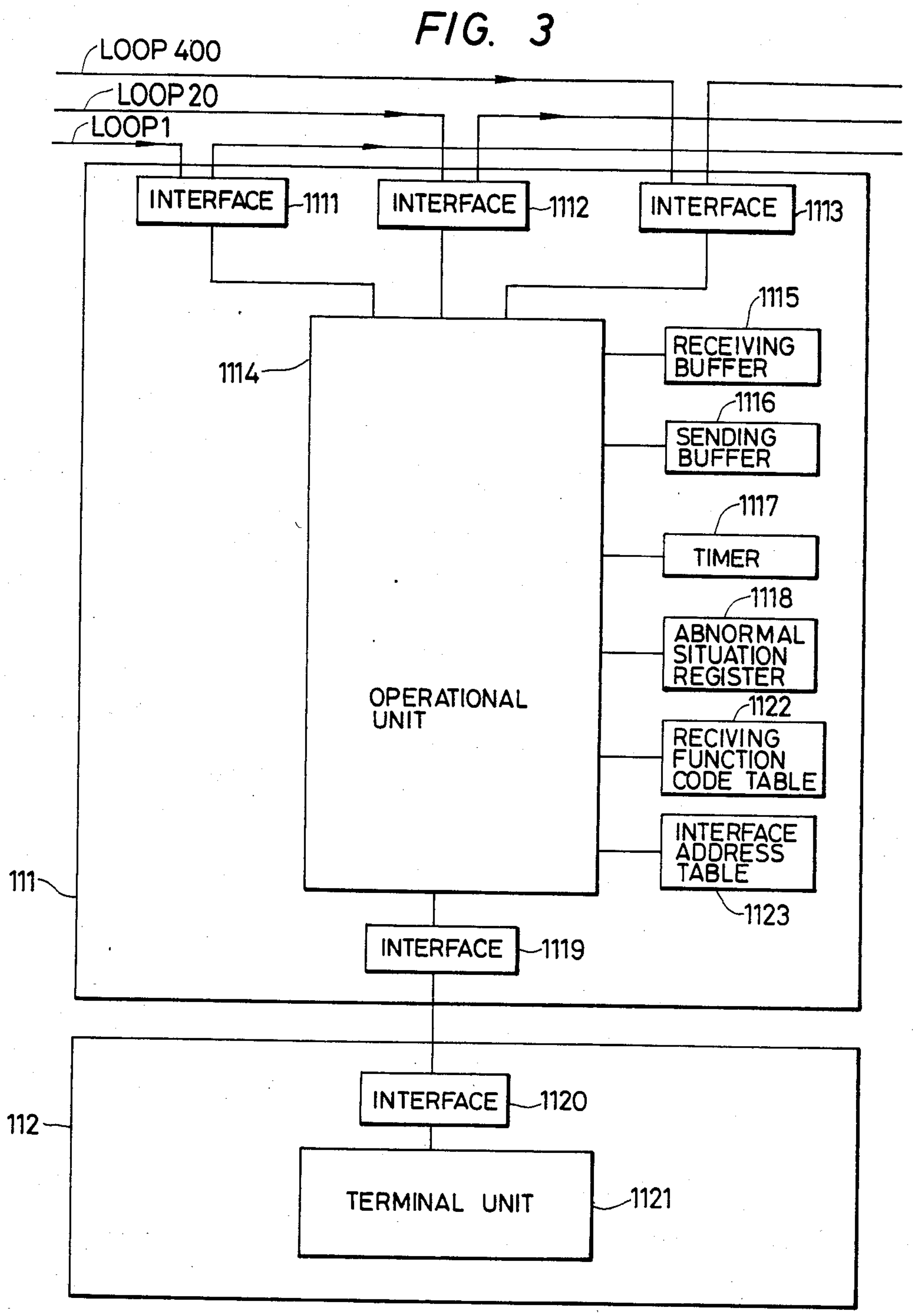
FIG. 3 is a block diagram showing the structure of nodes and terminals of the present invention.

The structure of the nodes in FIG. 3 is exactly the same except that the number of interfaces changes in accordance with the number of loop transmission routes to which each node is connected. When each node is connected to two loop transmission routes are shown in FIG. 1, the interfaces are only those represented by 1111 and 1112, and when each node is connected to three loop transmission routes as shown in FIG. 2, the interfaces are three, i.e., 1111, 1112 and 1113. An interface address table 1123 stores therein the address of each interface and to which loop the interface is connected.

Next, the sending/receiving function of each node will be described. Since the sending/receiving function of each node remains the same even when the system configuration changes as shown in FIGS. 1 and 2, the description will hereby be given on the mesh structure shown in FIG. 2.

When data to be delivered to a terminal unit 1121 develops, it is sent to the transmission controller 111 through the interface 1120. The transmission controller 111 stores the data sent from the terminal 112 in a sending buffer 1116. An operational unit 1114 sends the data to all the loops connected thereto. It will be now assumed that the loops 1, 20 and 400 are connected to the transmission controller 111. The operational unit 1114 searches sequentially and repeatedly the interfaces 1111, 1112 and 1113, and when it detects the interface of the loop which is not sending the data, the operational unit sends the data through that interface, e.g., the interface 1111. After sending the data from the interface 1111, the operational unit 1114 raises a sending-finish flag 2006 in the direction of 1111 in response to the data inside the sending buffer 1116. The data from the interface is sent in the construction of a message format 1000 shown in FIG. 6.

Front and rear flags 1001, 1007 and GCS1006 of the message are added by the interface. The operational unit 1114 adds a content code 1002, a sending source address 10031, a relay address 10032, a sending source control code 10041 and a relay control code 10042 to the data. The content code 1002 is a code that represent the content of the data 1005. The sending source address 10031 is the address which is stored in 1123 of the transmission controller 111 which transmits the data, and is fixed. The relay address 10032 is an address which is put when a received message is relayed to other loops. The control codes 10041, 10042 represents the order (serial number) of the messages that are transmitted from, or relayed by, the transmission controller 111, and change with the data. When the data is sent, the operational unit 1114 sets a timer 1117 in response to the data and its transmission interface 1111, and writes the serial number corresponding to the data into the sending source control code 2004. If the serial number has already been written into 2004 when the transmission controller 111 delivers the data to the loops, that serial number is used as such.

The transmission controller that has sent the data from the terminal to the loops makes the sending source address 10031 the same as the relay address 10032. When detecting that the sent data has made a round through the loop 1 on the basis of the relay address 10032, the operational unit 1114 sets the sending-finish flag 2007 in the direction of 1111 of the data inside the sending buffer 1116, and resets the timer 1117 corresponding to the sending interface of the data.

Upon receiving the message from the connected loop through the interface 1111, 1112 or 1113, each transmission controller 111 stores the message together with the number of the interface in the receiving buffer 1115. If the data is not self-sending data and does not exist in, or has not yet been received by, the receiving buffer, the operational unit raises a reception-finish flag 2007 for that data and for that interface. The reception-finish flag is the same as the sending-finish flag (see FIG. 7). Whether or not the received message is the same as the message that has already been received is judged by the sending source address 2003 and the serial number inside the sending source control code 2004. If the same data has already been received or if the data is the self-sending source data, the operational unit raises the reception-finish flag 2006 for the corresponding data inside the receiving buffer 1115 or sending buffer 1116, and for the corresponding interface. When the relay address of the received message is not the address of its own, the operational unit 1114 sends the received message to the loops from the interface that has received the data. In this manner, the message sent to the loop makes a round through the loop and is then cleared unless any obstacle exists on the loop.

The transmission controller of the sending source and the transmission controller that has received the data send the data inside the receiving and sending buffers 1115, 1116, to the interface for which the sending-finish or reception-finish flag 2007 has not yet been raised, through the interface. When the data is sent, the sending-finish flag 2006, the reception-finish flag 2007 and the timer 1117 are operated in the same way as described previously. In this manner, each transmission controller sends the message to all the loops connected thereto. If the reception-finish flag 2007 or the sending-finish flag 2007 is raised for each data inside the receiving buffer 1115 or sending buffer 1116 in the directions of all the interfaces, the data is judged as having been sent to all the loops. If the content code 2002 of the reception message is coincident with one that has been registered in the reception content code 1122, that data is sent to the terminal 112. The data that has been sent to all the loops after completion of transfer to the terminal, or if the transfer to the terminal is not necessary, are cleared from the receiving buffer 1115 or the sending buffer 1116 except the sending source address 2003 and the sending source control code 2004. The content code is registered to the reception content code table 1122 by writing from the terminal at the time of rise of the power source of the terminal 112 and the transmission controller 111.

The transmission controller sends again the data to the loop even when the timer 117 that has been set with respect to the sent data reaches a predetermined value $T_1$, if that message has not yet made a round through the loop and has not yet returned. If the data has not yet made a round through the loop and has not yet returned even after this re-sending operation is repeated a predetermined number N of times, the loop is judged as being abnormal, and an abnormality detection flag 2008 of the data corresponding to the direction of the interface and the flag of an abnormal situation register 1118 corresponding to the interface are set.

Figure 7:
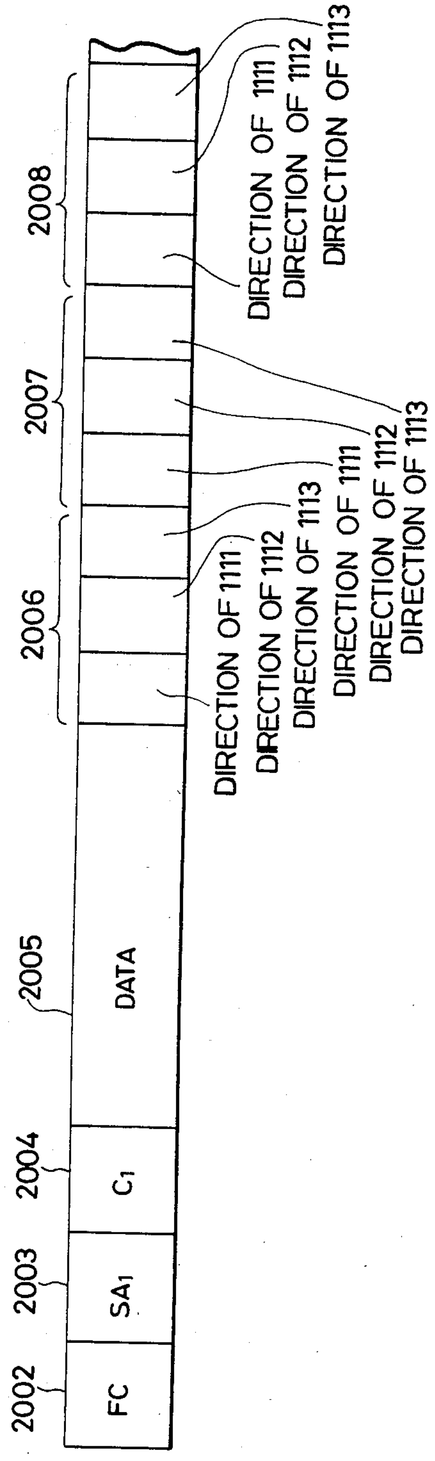

The data format inside the receiving and sending buffers 1115 and 1116 is shown in FIG. 7. However, the sending source address 2003 inside the sending buffer 1116 is not written into this item because it is a self-address.

When any of the sending-finish or reception-finish flag 2007 of the data 2005 in the sending buffer 1116 or the receiving buffer 1115 corresponding to all the interfaces and the abnormality detection flag 2008 is set and the flags in all the directions are provided, sending of the data in the loop direction is judged as having been completed. After the data has been sent and if necessary, after that data has been sent to the terminal 112, too, the associated data other than the sending source address 2003 and the sending source control code 2004 in the receiving buffer 1115 or the sending buffer 1116 is cleared.

Even after the sending treatment has been finished, the sending source address 2003 and the sending source control 2004 are preserved without being cleared in the receiving buffer 1115 and the sending buffer 1116. Therefore, even when a message having the preserved sending source address 2003 and sending source control code 2004 is received after completion of the sending treatment, the data is merely cleared as having been already received and been subjected to the necessary treatment.

The transmission controller 111 that detects the abnormality on the loop and sets the abnormality flag in the direction of the interface to the abnormal situation register 1118 makes the following check to detect the abnormal position, and specifies the abnormal position.

Figure 8:
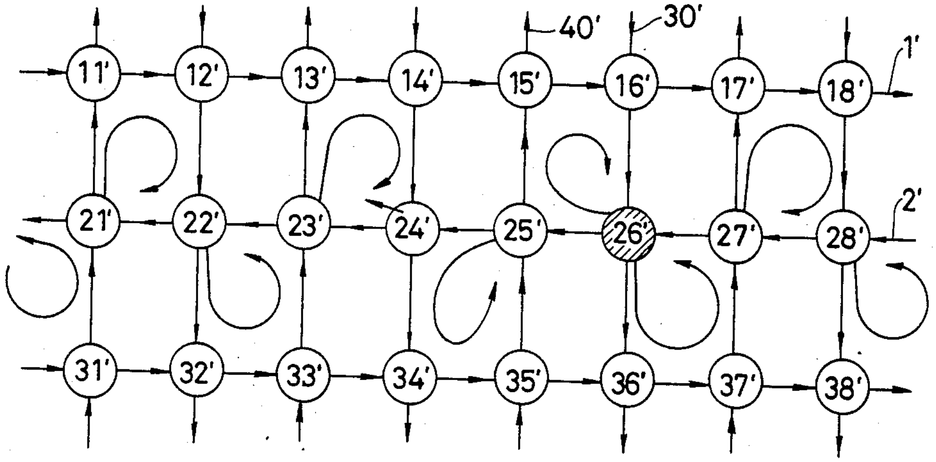
FIGS. 8 through 11 are schematic views, each showing a network check route in the present invention.
Figure 9:
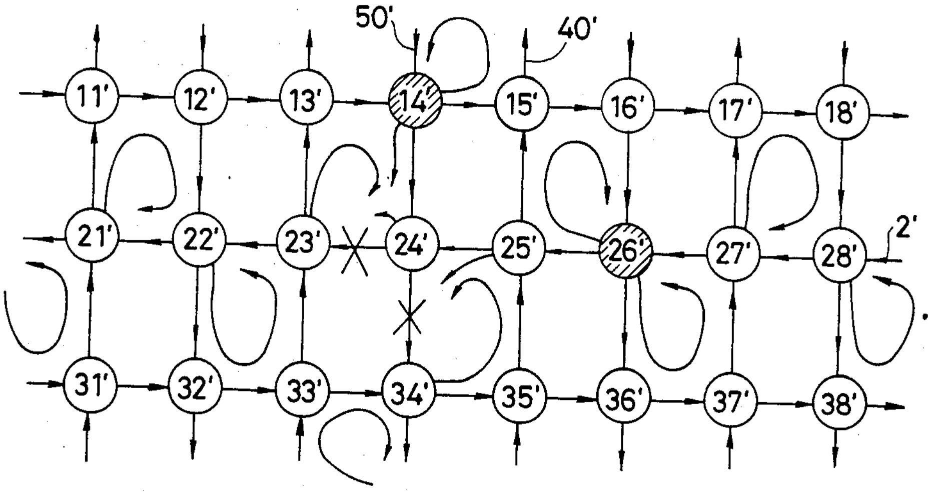

An abnormality check method for the matrix construction is shown in FIGS. 8 and 9.

It will be assumed that a trouble occurs between the nodes 23' and 24' on the loop 2', for example, as shown in FIG. 8. It will also be assumed that the node 26' is about to send the message to the loop 2'. In this case, the message does not make a round through the loop 2′ due to the trouble between the nodes 23′ and 24′, and does not return to the node 26′. When the operational unit 1114 detects that the message does not return within a predetermined time $T_1$, it sends repeatedly the message N times, as described earlier. If the message does not return even after N times, the flag of the abnormal situation register 1118 is set in correspondence to the interface in the direction of the loop 2′.

Figure 6:
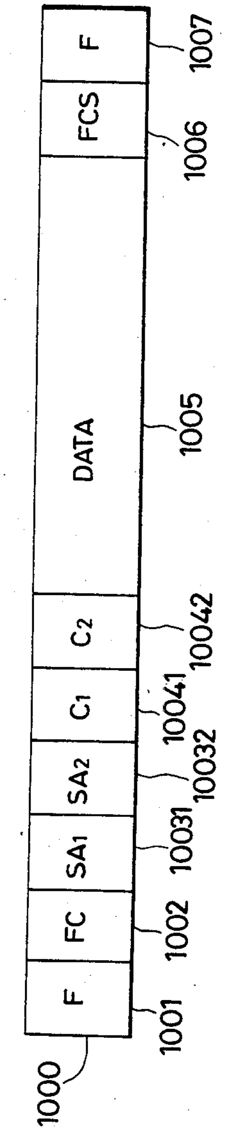
FIGS. 6 and 7 are schematic views, each showing the format of message in the present invention.

If the flag is set to the abnormal situation register 1118, the operational unit 1114 generates a small loop check signal and sets the timer 1117 in response to the small loop check signal in order to detect the position of trouble on the loop. The message format of the small loop check signal is shown in FIG. 6. Here, the data representing the address of the node 26′ which detects the abnormality on the loop 2′ and generates first the small loop check signal, the loop number which is to be checked, and the moving direction (forward/backward) of the small loop are written into the data portion 1005. The timer 1117 is checked in response to the small loop check signal for each moving direction. The small loop check signal in the advancing direction is produced in the sending direction of the loop 2′. This small loop check signal is not caused to flow in the direction of loop 2′ at the next node 25′, but is bypassed to the other loop 40′. This is executed as the node 25′ judges the small loop check signal from its content code 1002 and sends the data to the interface 1112 (or 1113) other than the interface from which it receives the data, such as the interface 1111 if the node 25′ correctly judges the signal as the small loop check signal. Similarly, the signal is bypassed at the node 15′ of the loop 40′ and then at the node 16′ of the loop 30′ and returns to the first sending source 26′.

The node 26′ recognizes from the data portion 1005 that the small loop check signal of the loop 2′ in the advancing direction has made a round, judges that no abnormality exists in the forward direction of the loop 2′, and resets the timer 1117 corresponding to the small loop check signal. On the other hand, the small loop check signal in the backward direction is sent in the direction of the loop 30′ separate from the loop 2′. Each node 36′, 37′, 27′ that receives this small loop check signal executes the same processing as described above, and the small loop check signal is returned to the sending source 26′. The node 26′ recognizes from the data portion 1005 that the small loop check signal in the backward direction of the loop 2′ has made a round, and judges that no abnormality exists in the backward direction of the loop 2′.

The node on the loop 2′ that has received the small loop check signal functions by itself as a new sending source, and generates a small loop check signal in the same direction as the small loop check signal that has been received. For example, the node 25′ receives the small loop check signal in the forward direction from the node 26′ of the loop 2′. The node 25′ then generates the small loop check signal in the forward direction to the loop 2′. The node 27′ that has received the small loop check signal in the backward direction sends the small loop check signal in the backward direction to the direction of the node 17′. In this manner, the nodes on the loop 2′ sequentially produce the new small loop check signals while relaying the small loop check signals. Those nodes on the loop 2′ other than the node 27; that has produced first the small loop check signal, which have relayed that small loop signal and then produce the new small loop check signals do not change the data portion 1005 of the small loop check signals that have already been received. Therefore, if no trouble exists at all on the loop 2′ and if the node 26′ produces the small loop check signal which is then relayed by each node 21′-25′, 27′-28′ and returns again to the node 26′, the sending source node 26′ judges that it is the first sending source of the small loop check signal, that has been received, from the data portion 1005 of the received small loop check signal, and does not relay the small loop check signal and does not produce a new small loop check signal, either.

If a trouble exists between the nodes 23′ and 24′ and sending becomes impossible, the small loop check signals produced from the nodes 23′ and 24′ do not return. If the operational unit 1114 does not receive the small loop check signal that has been produced by itself even after the passage of a predetermined time $T_2$ of the timer 1117, it again sends the small loop check signal. If the signal does not return even after it has been sent again and again N times, the trouble is judged as having occurred on the loop 2′ which is to be checked, and the operational unit 1114 sets the flag to the abnormal situation register 1118 to the effect that the trouble exists on the loop 2′. Having detected the trouble on the loop 2′, the nodes 23′ and 24′ report the result of detection. The node that has received the result of the detection specifies that the trouble exists on the loop between the nodes 23′ and 24′. If the troubles exist at two positions, i.e., between the nodes 23′ and 24′ and between 24′ and 34′ as shown in FIG. 9, for example, the small loop check signals are sequentially generated first from the node 14, for example, in the same way as in the case where the trouble occurs only at one position shown in FIG. 8, and the positions of troubles can be judged as being between the nodes 23′ and 24′ and between the nodes 24′ and 34′.

Figure 10:
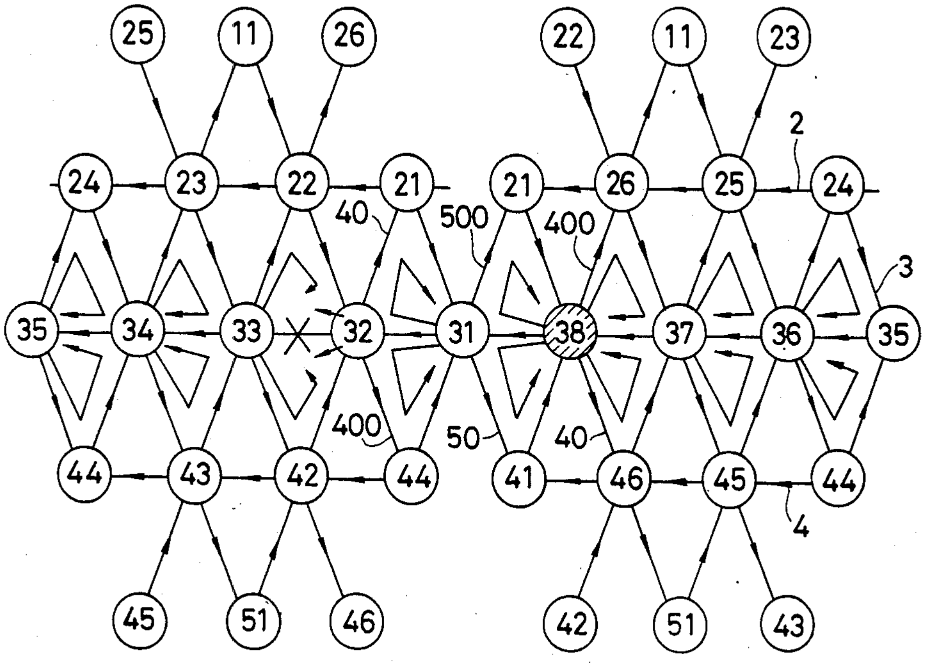

Next, it will be assumed that the trouble occurs between the nodes 32 and 33 in the mesh structure shown in FIG. 10. It will be assumed also that the node 38 sends the message to the loop 3. In this case, the operational unit sets the flag representing the abnormality of the loop 3 to the abnormal situation register 1118 to the effect that the abnormality exists on the loop 3, by executing the re-sending processing in the same way as above.

When the flag is set to the abnormal situation register 1118, the operational unit 1114 produces the small loop check signal to detect the position of trouble on the loop in the same way as described above. That is, the node 38 produces the small loop check signals in both forward and backward directions. The message format of the small loop check signal is the same as one described already. Upon receiving this small loop check signal, the node 31 does not pass this small loop check signal to the loop 3 but bypasses it to the loops 50 and 500. Upon receiving this small loop check signal, the nodes 21 and 41 bypass the signal to the loops 40 and 400. The nodes 21, 41 do not bypass this small loop check signal to the loops 2 and 4 that are parallel to the loop 3 that is to be checked. The loop number of the loop 3 to be checked in written into the data portion 1005 of the small loop check signal, and each node 21, 41 can know the loop 2, 4 parallel to the loop 3 on the basis of this loop number, and knows, on the basis of the interface address table 1123, the interface that does not bypass the small loop check signal. Therefore, the operational unit 1114 does not send the small loop check signal to this interface. As each node processes the small loop check signal in the same way as described above, the nodes 32 and 33 judge that the abnormality exists between the adjacent nodes on the loop 3. Since the nodes 32 and 33 report the result of detection in the same way as described already, each node receiving the result can judge that the trouble exists between the nodes 32 and 33 of the loop 3.

Figure 11:
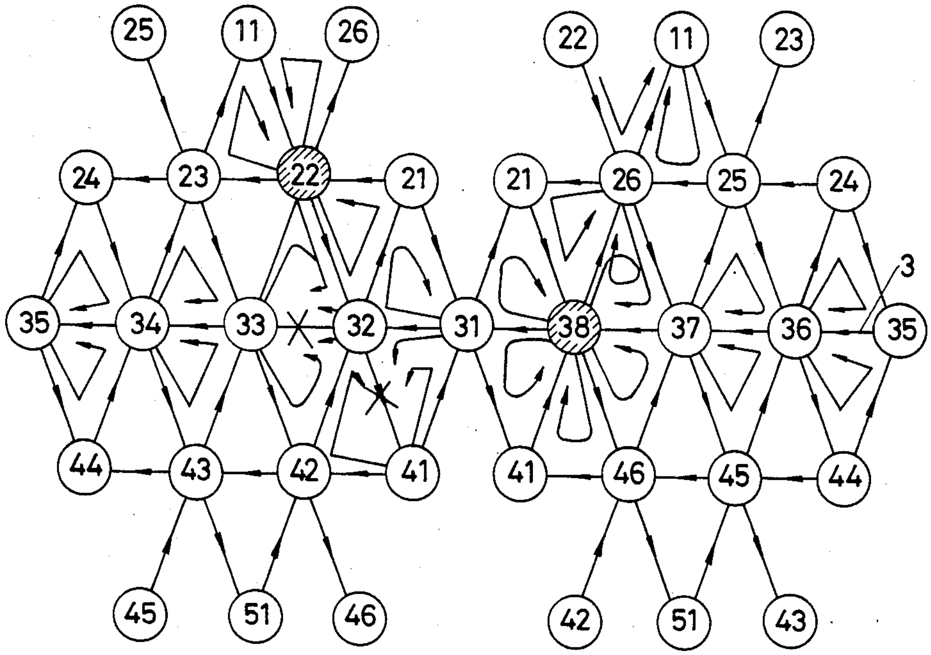

FIG. 11 shows the case where the troubles occur at two positions in the mesh structure. In this instance, the nodes 38 and 22 first execute small loop check, and the nodes 31, 32, 33, 22 and 41 detect the abnormality. On the basis of this result of detection, each node can know that the troubles exist between the nodes 31 and 33 of the loop 3 and between the nodes 22 and 41 of the loop 400.

After knowing the position of trouble, each node writes the position of trouble into the abnormal situation register 1118.

The node that has specified the position of trouble on the basis of the small loop check signal periodically produces the small loop check signals in the direction of trouble in order to detect the recovery of trouble. The node reports the recovery if the small loop check signal returns normally thereto, and the node that has thus known the recovery of trouble corrects the data of the position of trouble in the abnormal situation register 1118.

The node that has known the position of trouble on the loop from the data of the position of trouble of the abnormal situation register 1118 delivers the message to that loop, and judges that the data does not make a round even if it is sent again. Therefore, the nodes of the loop on which the trouble occurs do not first produce the small loop check signal, but do relay the small loop check signal generated by other nodes.

According to the present invention, a processing unit disposed in a three-dimensional space can be constituted homogeneously by a plurality of loop transmission routes. The transmission controller at each node is exactly homogeneous, and can execute transmission and abnormality processing without the necessity of knowing the situation of the system as a whole and the overall construction of the system. Therefore, a communication network which is highly reliable and highly expansive and is for maintenance and inspection can be accomplished. Each transmission controller uses exactly the same hardware and software, has high mass-producibility and can improve producibility.

What is claimed is:

1. A communication network system comprising:

at least a first transmission loop line;

a plurality of second transmission lines each crossing said first transmission line at at least two positions;

a plurality of transmission controllers, each connected to said first transmission loop line and to a transmission line of said plurality of second transmission lines at the position of said crossing of said each second transmission line of said first transmission line;

each of said transmission controllers containing means for sending a loop check message to a transmission line connected thereto, and for receiving said message through another transmission line connected thereto, and means to detect an abnormally of the loop composed of said transmission line and another transmission line connected thereto, by the response to said loop check message.

2. A communication network system in accordance with claim 1 wherein:

each of said second plurality of transmission lines are configured as loop lines.

3. A communication network system according to claims 1 or 2 further comprising:

at least one third transmission line crossing said at least first transmission loop line at at least two crossing positions, and each of said transmission controllers is further connected to said at least one third transmission line.

4. A communication network system according to claim 2 wherein each of said first or second transmission lines are configured as loop lines.

5. A communication network system according to claim 1 wherein each of said transmission controllers has means, when said abnormality is detected, for transmitting messages to lines besides the loop in which said abnormality is detected.

6. A communication network system according to claim 1 wherein each of said transmission controllers has means, when said abnormality is detected, of sending repeatedly said loop check message to said loop where said abnormality is detected to detect if said loop has recovered from the abnormality.

7. A communication network system according to claim 1 wherein each of said transmission controllers has means for sending at least one loop check message to another loop when said loop check message is received.

8. A communication network system comprising:

at least a first transmission loop line;

a plurality of second transmission lines each crossing said first transmission line at at least two positions;

a plurality of transmission controllers, each connected to said first transmission loop line and a transmission line of said plurality of second transmission lines at the position of said crossings which are arranged in a shape of encompassing the surface of a solid; and wherein each of said transmission controllers contains means for independently initiating checking for abnormalities in the network.

9. The communication network system as defined in claim 8 wherein each of said transmission controllers includes means for sending a small loop check message to a small loop consisting of a plurality of said transmission controllers adjacent thereto and to routes connected to the plurality of said transmission controllers adjacent thereto, and means for detecting the absence of an abnormality of said small loop from said small loop check message having made a round through said small loop.

10. The communication network system as defined in claim 8 wherein each of said transmission controllers includes means for sending a small loop check message along said small loop to the sending source of said message upon receiving said small loop check message.

11. The communication network system as defined in claim 8 wherein each of said transmission controllers includes means for sending only said small loop check message along said loop-like route of said sending source of said message.

* * * * *